Aug. 27, 1968    R. N. RAND ET AL    3,399,127
ELECTROPHORESIS MEDIUM USING AGAROSE AND CARRAGEENAN
Filed May 21, 1965
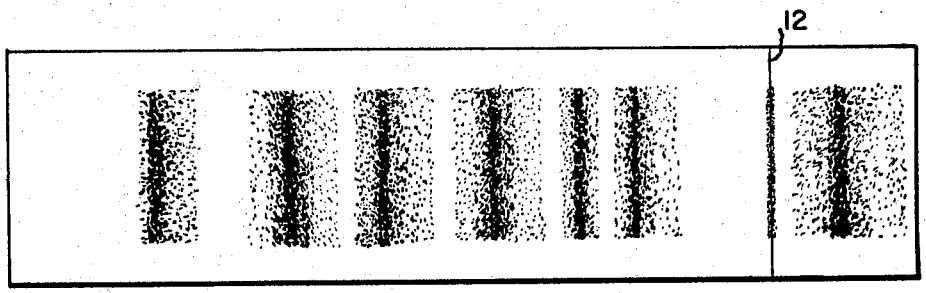
FIG. 2
FIG. 1
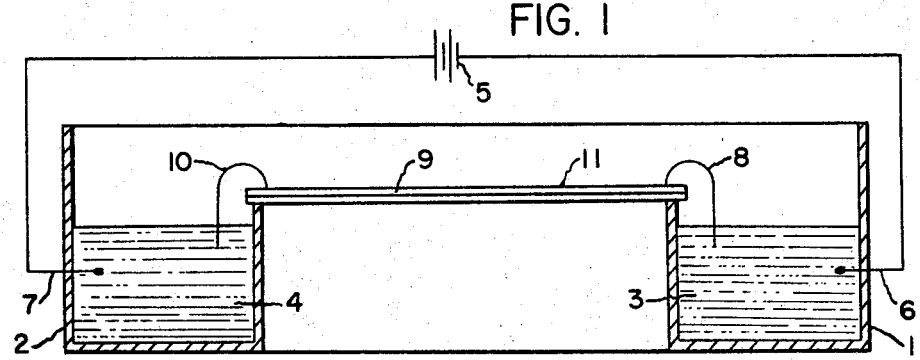
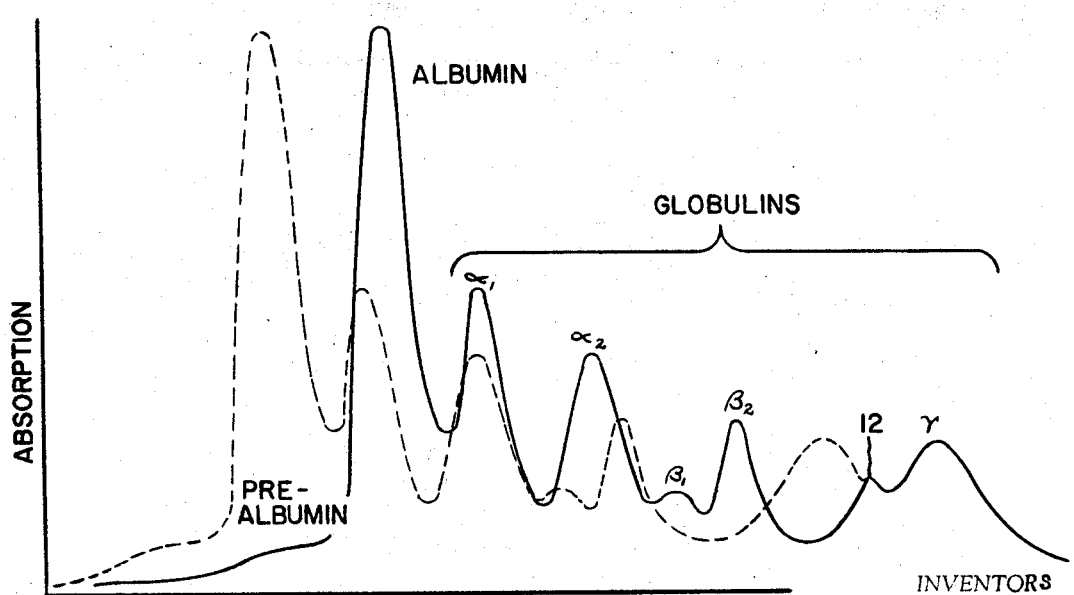
FIG. 3    SCAN
INVENTORS
ROYDEN N. RAND
GEORGE P. MUELLER
BY
ATTORNEYS

United States Patent Office 3,399,127
Patented Aug. 27, 1968

3,399,127
ELECTROPHORESIS MEDIUM USING AGAROSE AND CARRAGEENAN
Royden N. Rand, Pittsford, N.Y., and George P. Mueller, Camden, Maine, assignors, by direct and mesne assignments, to Bausch & Lomb Incorporated, Rochester, N.Y., a corporation of New York
Filed May 21, 1965, Ser. No. 457,660
9 Claims. (Cl. 204—180)

This invention relates to electrophoresis and more particularly to an improved medium for supporting the components analyzed by an electrophoresis system.

Electrophoresis is the movement of ions or charged particles in an electric field. Electrophoresis adapts itself well to clinical analysis for determining the presence and the quantities of substances such as enzymes, serums, carbohydrates, proteins including albumin and globulins etc. Molecules carrying ions making up these various substances are placed on a migration medium is an electric field and are caused to migrate in a direct relationship to their electric charge and physical properties. The mobility of the various charged particles is also partially controlled by the migration medium upon which the test sample to be analyzed is deposited. A certain amount of diffusion and endosmosis is associated with this type of electrophoresis which can be overcome by providing an improved electrophoresis medium which will provide better resolution during the evaluation subsequent to the migration of the charged particles. Accordingly, this invention is intended to provide this improved medium.

It is an object of this invention to provide an improved electrophoresis medium.

It is another object of this invention to provide an additive for use in an agarose gel which operates as the supporting medium for the sample being analyzed in an electrophoresis process.

It is a further object of this invention to provide an electrophoresis medium including agarose and carrageenan additive to improve the mobility and resolution in the analysis through electrophoresis process.

It is a further object to provide an electrophoresis medium having controlled electro-endosmosis for improved resolution of serum proteins.

The objects of this invention are accomplished by establishing an electric field across a migration medium of a buffered solution and a gelling agent including agarose and an additive of carrageenan. The electric field is produced by a direct current source forming a voltage gradient across the migration medium. The substance analyzed is deposited on, or in the medium and the various fractions in the substance migrate in accordance with the charge and the physical characteristics of the substance. By improving the mobility of the charged particles and controlling the electro-endosmosis and decreasing the adsorption in the supporting medium a greater resolution is provided. Agarose in contrast to agar contains no acidic groups and adsorption effects are minimized. The carrageenan improves the mobility of the various fractions through controlled electro-osmosis and thereby improves the resolution of the system. Subsequent to the migration of the various fractions a radiant flux is caused to scan the migrated fractions and the absorption of the radiation is measured to thereby evaluate quantitively the various fractions in the substance analyzed. The preferred embodiment of this invention will be described in the subsequent description and illustration of the system in which the analysis is performed.

FIG. 1 illustrates an electrophoresis system in which the improved medium may be used.

FIG. 2 is an illustration of the migrated fractions.

FIG. 3 is an illustration of the graphic recording of the migrated fractions as evaluated by the scanning means.

Referring to FIG. 1 the containers 1 and 2 are adapted to receive an electrophoretic buffered solution 3 and 4 respectively. A negative electrode 6 is inserted in the buffered solution 3 and connected to the negative side of the source of electrical energy 5. The positive electrode 7 is inserted in the buffered solution 4 and connected to the positive side of the source of electrical energy 5. A connecting strip 8 connects one end of the migration medium 9 to the buffered solution 3. The electric connector strip 10 connects the buffered solution 4 to the opposite end of the medium 9. The voltage is thereby applied across the medium 9 upon which the substance 11 is deposited and the various fractions in the substance are caused to migrate in accordance with their mobility and physical characteristics.

FIG. 2 illustrates the relative positions of the various fractions subsequent to migration on the migration medium as disclosed in FIG. 1. The serum proteins are applied on the line 12. The migration of the various fractions are as indicated. The electrophoretic medium in a conventional electrophoresis system uses agar. Agar is an acidic polysaccharide that is extracted from various red algae. The raw product is so heterogeneous that it must be purified. Agar however, does contain acidic groups which cause electro-endosmosis and which affect the readings in an electrophoresis system. Agarose is a derivative of agar and is a well defined polysaccharide containing no acidic groups. Agarose as an additive to a buffered solution does provide a medium having controlled electro-endosmosis. A medium of this type may be used for electrophoresis and will produce when used with serum proteins a curve as indicated by the dotted line illustrated in FIG. 3. The albumin and alpha-globulins migrate from the point of application. The beta-globulin and gamma globulins migrate considerably less and are closer to the point of application. The point of application always causes an error in the reading in the application zone. If the various fractions are caused to migrate away from this zone the accuracy of the reading is improved.

Accordingly, a reading of much better resolution is possible in analyzing serum proteins with the use of agarose as the gelling agent and carrageenan added to the agarose. Carrageenan is high in bound sulphate ions. The sulphate ions are bound to the molecules and cause a migration of some protein fractions in the opposite direction from the point of application. The point of application of the test sample causes a false reading of the fractions in this area due to disturbance of the migration medium by the applicator. Electro-endosmosis is controlled by using the carrageenan as an additive. The agarose has no acidic groups, and is non-ionic, so that by adding a known amount of carrageenan which contains bound ions in a predetermined quantity the electro-endosmosis is controlled. The albumin alpha and beta globulins migrate to the left from the point of application. The gamma globulins has practically no migration, however, the electro-endosmosis through migration of the water molecule causes a mass movement of the background medium in the opposite direction from the other protein fractions, which carries the gamma-globulins away from the point application. The controlled migration thereby causes improved resolution. The relative migration is shown by the graphs in FIG. 3 of which the solid line indicates the use of carrageenan and the broken line indicates the migration without the use of carrageenan.

A buffered solution which provides satisfactory operation is sodium phosphate. A specific example of a solution is .588 percent sodium phosphate used in 400 milliliters of water and to this is added .17% agarose and .0093% carrageenan. The applicants have used these percentages and found them to be satisfactory however, the applicants do not wish to limit the invention to these percentages as it is believed the percentages would vary depending on the concentration of the fractions of protein and also the type of materials being analyzed. The approximate range of percentages for agarose may be .1 to .3 gram per 100 milliliters. The buffer solutions may be sodium or potassium phosphate of approximately pH of 8.8. The range for the sodium phosphate may be approximately .6 to .7 gram per 100 milliliters and the potassium phosphate of approximate range of .5 to .6 gram per 100 milliliters. Carrageenan would be preferably in the "lamda" form. The inventors do not wish to limit the carrageenan to this form but merely mention the form for the purpose of illustration. The range of carrageenan may be between .001 to .1 gram per 100 milliliters.

The analysis in determining the curves of FIG. 3 are accomplished by causing a beam of radiation to pass through the migrated medium as shown in FIG. 2. The beam of radiation sweeps through the length of the migrated mediums and produces a curve as indicated in direct proportion to the amount of radiation absorbed by the various fractions of protein.

The preferred embodiment of this invention has been described and it is understood that other modifications might be devised which would fall within the scope of the invention defined by the attached claims.

We claim:
1. A medium for use in electrophoresis comprising, an electrophoretic buffer solution, agarose, and carrageenan.

2. A medium for use in electrophoresis comprising, a buffer solution including sodium phosphate, a gelling agent of agarose, and an additive of carrageenan to control electroendosmosis in the process of electrophoresis.

3. A medium for use in electrophoresis comprising, a buffer solution having a pH of approximately 8.8, a gelling agent of agarose, carrageenan to provide control of electroendosmosis and for modifying resolution in the process of electrophoresis.

4. A medium for use in electrophoresis of serum proteins comprising, an electrophoretic buffer solution having a pH of approximately 8.8, a gelling agent including agarose, and carrageenan additive in amounts of less than .01% by volume of carrageenan.

5. A migration medium for use in electrophoresis comprising, a buffer solution consisting of sodium phosphate within the range of .6% to .7% by volume, a gelling agent consisting of agarose of a percentage within the range of .1% to .3% by volume, and an additive of carrageenan of a percentage within the range of .001% to .1% by volume to control electro-endosmosis.

6. A medium for use in electrophoresis comprising, a buffer solution consisting of potassium phosphate in water, a gelling agent consisting of agarose, an additive of carrageenan to control electro-endosmosis in the process of electrophoresis.

7. A medium for use in electrophoresis comprising, a buffer solution including potassium phosphate of a percentage within the range of .5% to .6% by volume, a gelling agent consisting of agarose of a percentage falling within the range of .1% to .3% by volume, an additive of carrageenan of a percentage within the range of .001% to .1% by volume to control electro-endosmosis in the process of electrophoresis.

8. A medium for use in electrophoresis comprising, a buffer solution including one of the group of, sodium phosphate, or potassium phosphate having a pH factor of approximately 8.8, a gelling agent consisting of agarose, an additive of carrageenan to control the electro-endosmosis of the percentage by volume within the range of .001% to .1%.

9. A medium for use in electrophoresis comprising, a buffer solution including one of the group of, sodium phosphate, potassium phosphate, an additive of carrageenan to control electro-endosmosis, and a gelling agent of agarose of a percentage by volume within the range of .1% to .3%.

References Cited
UNITED STATES PATENTS
3,129,158    4/1964    Raymond et al. _____ 204—180

OTHER REFERENCES
Hjertén, "Zone Electrophoresis in Columns of Agarose Suspensions," Journal of Chromatography, 1963, vol. 12, No 4.

HOWARD S. WILLIAMS, *Primary Examiner.*

A. C. PRESCOTT, *Assistant Examiner.*